(12) United States Patent
Debe et al.

(10) Patent No.: US 7,622,217 B2
(45) Date of Patent: Nov. 24, 2009

(54) FUEL CELL NANOCATALYST

(75) Inventors: Mark K. Debe, Stillwater, MN (US); Susan M. Hendricks, Cottage Grove, MN (US); George D. Vernstrom, Inver Grove Heights, MN (US); Alison K. Schmoeckel, Stillwater, MN (US); Radoslav Atanasoski, Edina, MN (US); Clayton V. Hamilton, Jr., Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 752 days.

(21) Appl. No.: 11/248,561

(22) Filed: Oct. 12, 2005

(65) Prior Publication Data

US 2007/0082256 A1    Apr. 12, 2007

(51) Int. Cl.
 *H01M 4/00* (2006.01)
(52) U.S. Cl. ......................................... 429/44; 502/101
(58) Field of Classification Search ................... 429/44; 502/101
See application file for complete search history.

(56) References Cited

U.S. PATENT DOCUMENTS

| | | | |
|---|---|---|---|
| 3,369,938 A | 2/1968 | Kroeger et al. |
| 3,382,105 A | 5/1968 | McBryar et al. |
| 4,021,369 A | 5/1977 | Lyons |
| 4,284,835 A | 8/1981 | Kim et al. |
| 4,340,276 A | 7/1982 | Maffitt et al. |
| 4,416,801 A | 11/1983 | Waller |
| 4,433,082 A | 2/1984 | Grot |
| 4,568,598 A | 2/1986 | Bilkadi et al. |
| 4,741,744 A | 5/1988 | Wu et al. |
| 4,812,352 A | 3/1989 | Debe |
| 4,824,835 A | 4/1989 | Mertens et al. |
| 4,866,099 A | 9/1989 | Hendy |
| 5,039,561 A | 8/1991 | Debe |
| 5,176,786 A | 1/1993 | Debe |
| 5,186,877 A | 2/1993 | Watanabe |
| 5,221,455 A | 6/1993 | Hanada et al. |
| 5,225,391 A | 7/1993 | Stonehart et al. |
| 5,294,232 A | 3/1994 | Sakairi et al. |
| 5,336,558 A | 8/1994 | Debe |
| 5,338,430 A | 8/1994 | Parsonage et al. |
| 5,472,799 A | 12/1995 | Watanabe |
| 5,523,181 A | 6/1996 | Stonehart et al. |
| 5,766,787 A | 6/1998 | Watanabe et al. |
| 5,766,788 A | 6/1998 | Inoue et al. |
| 5,840,192 A | 11/1998 | El Moussaoui et al. |
| 5,879,827 A | 3/1999 | Debe et al. |
| 5,879,828 A | 3/1999 | Debe et al. |
| 6,040,077 A | 3/2000 | Debe et al. |
| 6,059,943 A | 5/2000 | Murphy et al. |
| 6,242,135 B1 | 6/2001 | Mushiake |
| 6,319,293 B1 | 11/2001 | Debe et al. |
| 6,335,112 B1 | 1/2002 | Asukabe et al. |
| 6,624,328 B1 | 9/2003 | Guerra |
| 6,630,263 B1 | 10/2003 | McElroy |
| 6,635,384 B2 | 10/2003 | Bahar et al. |
| 6,649,295 B2 | 11/2003 | Hamrock et al. |
| 6,680,138 B1 | 1/2004 | Honma et al. |
| 6,864,006 B2 | 3/2005 | Honma et al. |
| 2002/0004453 A1 | 1/2002 | Haugen et al. |
| 2002/0015875 A1 | 2/2002 | Kim |
| 2002/0058172 A1 | 5/2002 | Datz et al. |
| 2002/0076594 A1 | 6/2002 | Fukuda et al. |
| 2002/0093008 A1 | 7/2002 | Kerres et al. |

(Continued)

FOREIGN PATENT DOCUMENTS

EP    0 459 820 B1    7/1997

(Continued)

OTHER PUBLICATIONS

M. Debe, A. Steinbach, K. Lewinski, G. Haugen, G. Vernstrom, R. Atanasoski, A. Hester, P. Turner, R. Ziegler, J. Larson, M. Hicks, and P. Serim; "Activities Of Low Pt Loading, Carbon-Less, Ultra-Thin Nanostructured Film-Based Electrodes For PEM Fuel Cells And Roll-Good Fabricated MEA Performances in Single Cells And Stacks", 2003 Fuel Cell Seminar, Fuel Cells for Secure, Sustainable Energy, Abstracts, Nov. 3-7, 2003, Miami Beach, Florida, Fontainebleau Hilton Hotel, pp. 812-815.

(Continued)

*Primary Examiner*—Patrick Ryan
*Assistant Examiner*—Thomas H. Parsons
(74) *Attorney, Agent, or Firm*—Philip Y. Dahl

(57) ABSTRACT

A fuel cell cathode catalyst is provided comprising nanostructured elements comprising microstructured support whiskers bearing nanoscopic catalyst particles; wherein the catalyst comprises platinum and manganese and at least one other metal selected from the group consisting of Group VIb metals, Group VIIb metals and Group VIIIb metals other than platinum and manganese; wherein the volume ratio of platinum to the sum of all other metals in the catalyst is between about 1 and about 4 and wherein the Mn content is equal to or greater than about 5 micrograms/cm2 areal density. Typically, the volume ratio of manganese to the at least one other metal is between 10:90 and 90:10. Typically, the at least one other metal is Ni or Co. In addition, a fuel cell MBA comprising the present cathode catalyst is provided. In addition, methods of making the present cathode catalyst are provided.

22 Claims, 2 Drawing Sheets

U.S. PATENT DOCUMENTS

| | | |
|---|---|---|
| 2002/0132157 A1 | 9/2002 | Finkelshtain et al. |
| 2003/0008196 A1 | 1/2003 | Wessel et al. |
| 2003/0013004 A1 | 1/2003 | Oyanagi et al. |
| 2004/0043283 A1 | 3/2004 | Cipollini et al. |
| 2004/0048129 A1 | 3/2004 | Taft, III et al. |
| 2004/0048466 A1 | 3/2004 | Gore et al. |
| 2004/0116742 A1 | 6/2004 | Guerra |
| 2004/0121210 A1 | 6/2004 | Hamrock et al. |
| 2004/0251450 A1 | 12/2004 | Kerres et al. |
| 2005/0069755 A1 | 3/2005 | Vernstrom et al. |
| 2005/0136308 A1 | 6/2005 | Andrews et al. |
| 2006/0046120 A1 | 3/2006 | Merzougui et al. |
| 2006/0063055 A1* | 3/2006 | Frey et al. ............... 429/33 |

FOREIGN PATENT DOCUMENTS

| | | |
|---|---|---|
| EP | 0 631 337 B1 | 7/2000 |
| EP | 1 133 806 B1 | 9/2002 |
| GB | 1 449 233 | 9/1976 |
| GB | 1 534 359 | 12/1978 |
| JP | 54-82042 A | 6/1979 |
| JP | 2001/118591 | 4/2001 |
| JP | 2001-321664 A | 11/2001 |
| JP | 2003-059497 A | 2/2003 |
| JP | 2003-123777 A | 4/2003 |
| JP | HEI-2003-282097 | 10/2003 |
| JP | 2004-273384 | 9/2004 |
| KR | 2000-0063843 | 6/2000 |
| WO | WO 00/24074 | 4/2000 |
| WO | WO 01/54216 A2 | 7/2001 |
| WO | WO 02/061871 A2 | 8/2002 |

OTHER PUBLICATIONS

M. Ludvigsson, J. Lindgren, and J. Tegenfeldt; "Incorporation And Characterisation Of Oxides Of Manganese, Cobalt, and Lithium Into 117 Membranes", Journal of Materials Chemistry, vol. 11, No. 4, Apr. 2001, pp. 1269-1276.

A. Michas, J. M Kelly, R. Durand, M. Pineri, and J.M.D. Coey; Preparation, Characterization And Catalytic Properties Of Perfluorosulfonated Ion-Exchange Membranes Containing Surface-Concentrated, Hydrated Ruthenium Oxide Particles, Journal of Membrane Science, vol. 29, No. 3, Dec. 15, 1986, pp. 239-257.

G. M. Chow et al.; "Fabrication Of Biologically Based Microstructure Composites For Vacuum Field Emission", Materials Science and Engineering, A158, 1992, pp. 1-6.

K. K. Kam, M. K. Debe, R. J. Poirier, and A. R. Drube; "Summary Abstract: Dramatic Variation Of The Physical Microstructure Of A Vapor Deposited Organic Thin Film", J. Vac. Sci. Technol, A, 5(4), Jul./Aug. 1987, pp. 1914-1916.

M. K. Debe, K. K. Kam, J. C. Liu, and R. J. Poirier; "Vacuum Vapor Deposited Thin Films Of A Perylene Dicarboximide Derivative: Microstructure Versus Deposition Parameters", J. Vac. Sci. Technol. A, 6 (3), May/Jun. 1988, pp. 1907-1911.

M. K. Debe and R. J. Poirier; "Effect Of Gravity On Copper Phthalocyanine Thin Films III: Microstructure Comparisons Of Copper Phthalocyanine Thin Films Grown in Microgravity And Unit Gravity", Thin Solid Films, vol. 186, 1990, pp. 327-347.

Y. Sadaoka, T. A. Jones, G. S. Revell, W. Gopel; Effects Of Morphology on $NO_2$ Detection In Air At Room Temperature With Phthalocyanine Thin Films, Journal of Materials Science, vol. 25, 1990, pp. 5257-5268.

S. Ohnuma, Y. Nakanouchi, and T. Masumoto; "Amorphous Ultrafine Metallic Particles Prepared By Sputtering Method", Rapidly Quenched Metals, Proc. Of the Fifth Int. Conf. On Rapidly Quenched Metals, Wurzburg, Germany, Sep. 3-7, 1984, S. Steeb et al., eds., Elsevier Science Publisher B.V., New York, 1985, pp. 1117-1124.

P. K. Lee and M. K. Debe, "Measurement And Modeling Of The Reflectance-Reducing Properties Of Gradient Index Microstructured Surfaces", Photographic Science and Engineering, vol. 24, (4), Jul./Aug. 1980, pp. 211-216.

H. Tang, J. H. Chen, Z. P. Huang, D. Z. Wang, Z. F. Ren, L. H. Nie, Y. F. Kuang, and S. Z. Yao; "High Dispersion And Electrocatalytic Properties Of Platinum On Well-Aligned Carbon Nanotube Arrays", Carbon, vol. 42, 2004, pp. 191-197.

A. Bonakdarpour et al., "Corrosion of Transition Metals, in $Pt_{1-x}M_x$ Proton Exchange Membrane Fuel Cell (PEMFC) Electrocatalysts", 2004 Fall Meeting of the Electrochemical Society of Japan, Hawaii, Oct. 3-8, 2004.

Fuqiang Liu, Baolian Yi, Danmin Xing, Jingrong Yu, Zhongjun Hou, Yongzhu Fu; "Development of Novel Self-Humidifying Composite Membranes for Fuel Cells", *Journal of Power Sources*, vol. 124, 2003, pp. 81-89.

J. Guan and G. Li, "Studies on Preparation of Ultrafine MnO Particles and Its Eletrocatalytic Performance in PEMFC", Huaxue Shijie 43 [1] (2002) pp. 7-9.

S. Kawatsu and M. Iwase, "Electrocatalysts for Polymer Electrolyte Fuel Cells", Jidosha Gijutsukai Ronbunshu (Transaction of the Society Automotive Engineers of Japan), vol. 28, No. 4, (Oct. 1997), pp. 39-42.

U.S. Appl. No. 10/945,178, filed Sep. 20, 2004, "Fuel Cell Durability", now pending.

U.S. Appl. No. 10/944,998, filed Sep. 20, 2004, "Durable Fuel Cell", now pending.

U.S. Appl. No. 11/248,441, filed Oct. 12, 2005, "Ternary Nanocatalyst and Method of Making", now pending.

U.S. Appl. No. 11/261,053, filed Oct. 28, 2005, "High Durability Fuel Cell Components with Cerium Oxide Additives", now pending.

U.S. Appl. No. 11/262,268, filed Oct. 28, 2005, "High Durability Fuel Cell Components with Cerium Salt Additives", now pending.

* cited by examiner

FUEL CELL NANOCATALYST

This invention was made with Government support under Cooperative Agreement DE-FC36-02AL67621 awarded by DOE. The Government has certain rights in this invention.

FIELD OF THE INVENTION

This invention relates to nanostructured thin film (NSTF) catalysts useful as fuel cell cathode catalysts.

BACKGROUND OF THE INVENTION

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. App. Pub. No. 2002/0004453 A1, now U.S. Pat. No. 6,482,763, the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured thin film catalysts.

U.S. Pat. Nos. 4,812,352, 5,039,561, 5,176,786, and 5,336,558, the disclosures of which are incorporated herein by reference, concern microstructures.

U.S. patent application Ser. No. 10/674,594, the disclosure of which is incorporated herein by reference, discloses fuel cell cathode catalysts comprising nanostructures formed by depositing alternating layers of platinum and a second layer onto a microstructure support, which may form a ternary catalyst.

U.S. patent application Ser. Nos. 10/945,178 and 10/944,998, the disclosures of which are incorporated herein by reference, discloses fuel cell membrane electrode assemblies and fuel cell polymer electrolyte membranes comprising bound anionic functional groups and Mn or Ru cations or comprising manganese oxides which demonstrate increased durability.

Ludvigson, J. Mater. Chem., 11 (2001) 1269-1276; Michas, J. Membrane Sci., 29 (1986) 239-257 and Japanese Kokai 2001/118591 (Morimoto) purportedly disclose polymer electrolyte membranes made by a method generally described as immersion of a membrane in a solution of a metal salt followed by an oxidization step to convert the metal salts into metal oxides in the finished product. The metal salts include Mn salts (in Ludvigson) and Ru salts (in Michas and Morimoto).

U.S. Pat. No. 6,335,112 (Asukabe) purportedly discloses a polymer electrolyte membrane comprising a hydrocarbon-based solid polymer electrolyte which contains a catalyst, which may be one of several catalysts including $MnO_2$.

U.S. Pat. App. Pub. No. US 2003/0008196 A1 (Wessel) purportedly discloses the use of at least one additive in or on electrodes of a fuel cell, where the additive purportedly serves for the prevention of the formation and/or for the destruction of peroxides on or in the electrodes.

SUMMARY OF THE INVENTION

Briefly, the present invention provides a fuel cell cathode catalyst comprising nanostructured elements comprising microstructured support whiskers bearing nanoscopic catalyst particles; wherein the catalyst comprises platinum and manganese and at least one other metal selected from the group consisting of Group VIb metals, Group VIb metals and Group VIIb metals other than platinum and manganese; wherein the volume ratio of platinum to the sum of all other metals in the catalyst is between about 1 and about 4, more typically between 1 and 4, more typically between about 2.5 and about 3.5, more typically between 2.5 and 3.5, and most typically about 3, and wherein the Mn content is equal to or greater than about 5 micrograms/$cm^2$ areal density. Typically, the volume ratio of manganese to the at least one other metal is between 10:90 and 90:10. In some embodiments, the volume ratio of manganese to the at least one other metal is between 40:60 and 60:40. In one embodiment, the volume ratio of platinum to manganese to the at least one other metal is about 6:1:1. Typically, the at least one other metal is Ni or Co.

The present invention also provides a fuel cell membrane electrode assembly (MEA) comprising the fuel cell cathode catalyst according to the present invention. In one embodiment, the MEA may comprise a polymer electrolyte membrane which comprises a polymer electrolyte that comprises bound anionic functional groups and manganese cations, which are typically present in an amount between 0.001 and 0.5 charge equivalents based on the molar amount of anionic functional groups present in the polymer. In some embodiments the polymer electrolyte membrane may comprise a polymer electrolyte comprising pendent groups according to the formula:

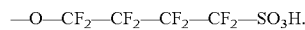

$$—O—CF_2—CF_2—CF_2—CF_2—SO_3H.$$

The present invention also provides a method of making the cathode catalyst of the present invention comprising alternating vacuum deposition of platinum and an alloy or intimate mixture of manganese and another metal selected from the group consisting of Group VIb metals, Group VIIb metals and Group VIIb metals other than platinum and manganese. The present invention also provides a method of making the cathode catalyst of the present invention comprising alternating vacuum deposition of platinum, manganese and another metal selected from the group consisting of Group VIb metals, Group VIIb metals and Group VIIIb metals other than platinum and manganese.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same projected area as the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein); and the symbol "Å" represents Angstroms, notwithstanding any typographical or computer error.

It is an advantage of the present invention to provide cathode catalysts for use in fuel cells.

DETAILED DESCRIPTION

Figure 1:
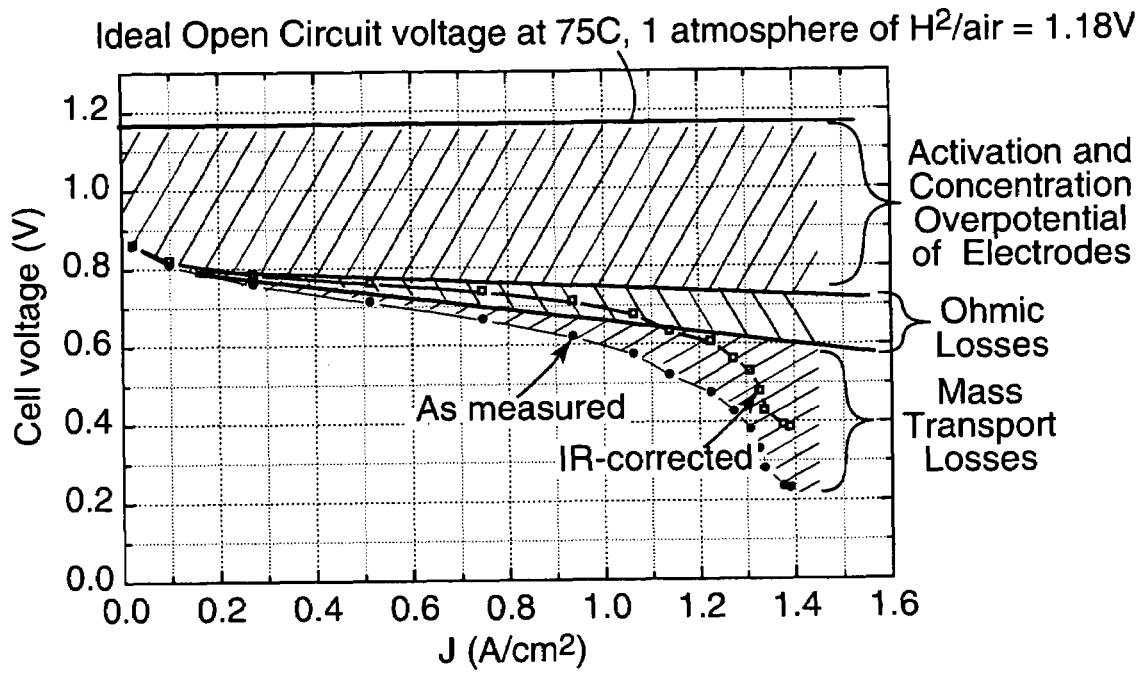
FIG. 1 represents a typical polarization curve, which is a plot of the cell voltage versus current density for a fuel cell membrane electrode assembly in operation, used herein to illustrate the three major contributors to cell voltage loss.

The present invention provides a fuel cell cathode catalyst comprising nanostructured elements comprising microstructured support whiskers bearing nanoscopic catalyst particles; wherein the catalyst comprises platinum and manganese and at least one other metal selected from the group consisting of Group VIb metals, Group VIIb metals and Group VIIIb metals other than platinum and manganese; wherein the volume ratio of platinum to the sum of all other metals in the catalyst is between about 1 and about 4, more typically between 1 and 4, more typically between about 2.5 and about 3.5, more typically between 2.5 and 3.5, and most typically about 3, and wherein the Mn content is equal to or greater than about 5 micrograms/cm² areal density. Typically, the volume ratio of manganese to the at least one other metal is between 10:90 and 90:10, and in some embodiments between 40:60 and 60:40. In one embodiment, the volume ratio of platinum to manganese to the at least one other metal is about 6:1:1. Typically, the at least one other metal is Ni or Co.

The present invention provides a fuel cell membrane electrode assembly (MEA) comprising the fuel cell cathode catalyst according to the present invention. The MEA according to the present invention may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are typically highly fluorinated and most typicaUy perfluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and FSO2 CF2CF2CF2CF2-O—CF=CF2, described in U.S. patent application Nos. 10/322,254, 10/322,226, now U.S. Pat. No. 6,624,328, and 10/325,278, now U.S. Pat. No. 7,348,088, which are incorporated herein by reference. The polymer typically has an equivalent weight (EW) of 1200 or less, more typically 1100 or less, more typically 1000 or less, and may have an equivalent weight of 900 or less, or 800 or less.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and in some embodiments about 25 microns.

In one embodiment of the present invention, one or more manganese oxides, such as $MnO_2$ or $Mn_2O_3$, is added to the polymer electrolyte prior to membrane formation. Typically the oxide is mixed well with the polymer electrolyte to achieve substantially uniform distribution. Mixing is achieved by any suitable method, including milling, kneading and the like, and may occur with or without the inclusion of a solvent. The amount of oxide added is typically between 0.01 and 5 weight percent based on the total weight of the final polymer electrolyte or PEM, more typically between 0.1 and 2 wt %, and more typically between 0.2 and 0.3 wt %. Factors mitigating against inclusion of excessive manganese oxide include reduction of proton conductivity, which may become a significant factor at greater than 0.25 wt % oxide.

In one embodiment of the present invention, a salt of manganese is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. Without wishing to be bound by theory, it is believed that the manganese cations persist in the polymer electrolyte because they are exchanged with $H^+$ ions from the anion groups of the polymer electrolyte and become associated with those anion groups. Furthermore, it is believed that polyvalent manganese cations may form crosslinks between anion groups of the polymer electrolyte, further adding to the stability of the polymer. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

To make an MEA or CCM, cathode and anode catalyst layer may be applied to the PEM by any suitable means. The present invention provides a CCM or MEA comprising certain cathode catalysts comprising nanostructured elements comprising microstructured support whiskers bearing nanoscopic catalyst particles. U.S. Pat. Nos. 4,812,352, 5,039,561, 5,176,786, and 5,336,558, the disclosures of which are incorporated herein by reference, concern microstructures which may be used in the practice of the present invention. U.S. Pat. Nos. 5,338,430, 5,879,827, 6,040,077 and 6,319,293 and U.S. Pat. App. Pub. No. 2002/0004453 A1, now U.S. Pat. No. 6,482,763, the disclosures of which are incorporated herein by reference, describe nanostructured elements comprising micro structured support whiskers bearing nanoscopic catalyst particles. U.S. Pat. No. 5,879,827 and U.S. Pat. App. Pub. No. 2002/0004453 A1, now U.S. Pat. No. 6,482,763, the disclosures of which are incorporated herein by reference, describe nanoscopic catalyst particles comprising alternating layers.

The nanoscopic catalyst particles according to the present invention may be made by the alternating application of first and second layers, the first layer comprising or consisting essentially of platinum and the second layer being an alloy or intimate mixture of manganese and a second transition metal selected from the group consisting of Group VIb metals, Group VIb metals and Group VIIIb metals other than platinum and manganese. Alternately, three layers may be applied, the first layer comprising or consisting essentially of platinum, the second layer comprising or consisting essentially of manganese, and the third comprising or consisting essentially of a second transition metal selected from the group consisting of Group VIb metals, Group VIb metals and Group VIIIb metals other than platinum and manganese. Typically the second transition metal is selected from the group consisting of nickel and cobalt. It is contemplated that alternating application of first and second layers does not exclude the application of layers in addition to the first and second layers. Typically, the volume ratio of manganese to the other transition metal is between 10:90 and 90:10. In some embodiments, the volume ratio of manganese to the other transition metal is between 40:60 and 60:40.

The average bilayer planar equivalent thickness of the first and second layers is typically less than 100 Å. The average bilayer planar equivalent thickness is typically greater than 3 Å and more typically greater than 8 Å.

Alternately, the ternary catalyst may be deposited from a single target, as disclosed in co-pending patent application Ser. No. 11/248,441, filed simultaneously herewith.

The volume ratio of platinum to the sum of all other metals in the catalyst is between about 1 and about 4, more typically between 1 and 4, more typically between about 2.5 and about 3.5, more typically between 2.5 and 3.5, and most typically about 3. The Mn content is equal to or greater than about 5 micrograms/cm$^2$ areal density. In one embodiment, the volume ratio of platinum to manganese to the at least one other metal is about 6:1:1.

Without wishing to be bound by theory, applicants believe that these parameters provide for increased performance and durability of a membrane electrode assembly (MEA) comprising the present cathode catalyst during use in a proton exchange membrane fuel cell. More specifically, these parameters provide optimization of the composition and structure of the cathode catalyst where the specific activity of the catalyst can be maximized and the amount of membrane decomposition from peroxides generated on those catalysts can be minimized. Applicants assert that these parameters represent an optimum window for catalyst composition and structure that simultaneously can achieve both optimizations.

Without wishing to be bound by theory, applicants invention may be considered in light of the following considerations. The performance of a PEM fuel cell under a given set of operating conditions is represented by its polarization curve, which is a plot of the cell voltage versus current density, usually expressed as A/cm$^2$ of active area of the MEA. The polarization curve may be considered to have three basic factors that contribute to loss of cell voltage, each of which manifests itself as the dominant loss mechanism in a different current density domain, as illustrated in FIG. 1. In the lower current density range, i.e., typically less than about 0.2 A/cm$^2$, the loss is primarily kinetic, due to catalyst activity and concentration overpotential losses. In the mid-range of current density, i.e., typically between about 0.2 and 1.0 A/cm$^2$, the loss of cell voltage is dominated by electrical impedances of the MEA components and interfaces. In the highest current density range, the loss of cell voltage is predominantly due to increasing difficulty of reactants to reach the catalyst sites, referred to as mass transport limitations. Both the gas diffusion layer and the catalyst layer can contribute to the mass transport overpotential losses.

Figure 2:
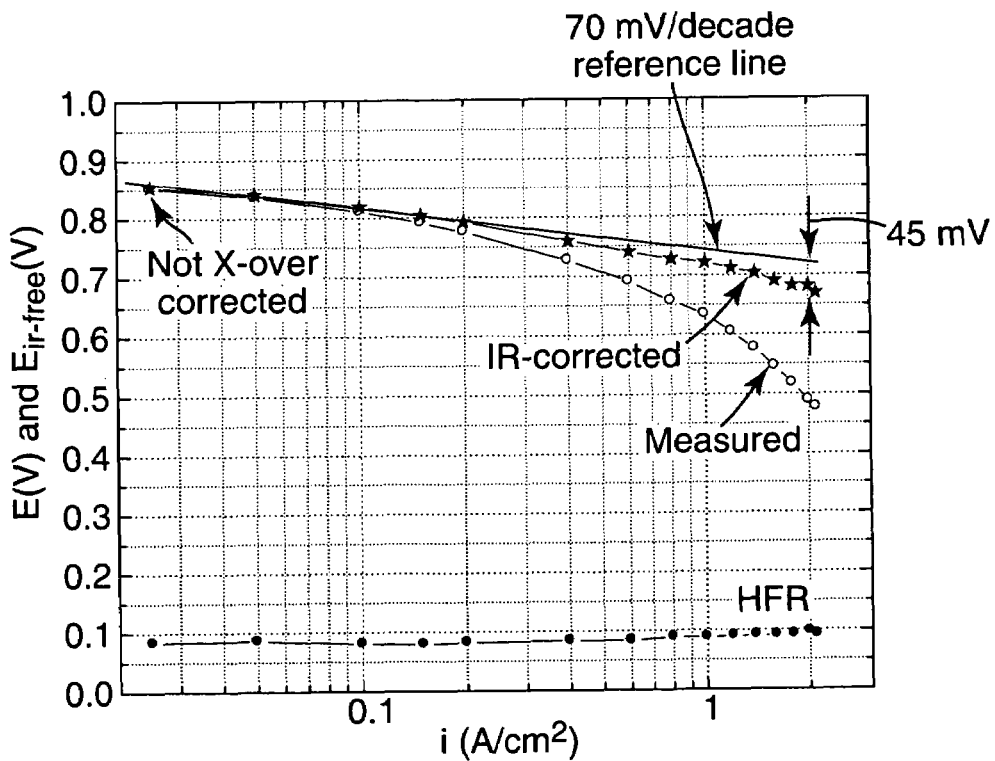
FIG. 2 represents a typical polarization curve, plotted as a Tafel plot of the cell voltage versus current density for a fuel cell membrane electrode assembly in operation, along with an IR-corrected Tafel plot, and a plot of the high frequency resistance, used herein to illustrate measurement of the three major contributors to cell voltage loss.

The kinetic loss contribution follows an exponentially decreasing function, whereas the resistance loss is a strictly linear function of current density. The mass transport loss contribution is a more complicated function, and most easily separated from the kinetic and IR losses in a logarithmic representation of the polarization curve, as illustrated in FIG. 2. The slope of the kinetic contribution is usually taken as approximately 70 mV/decade of increase in current density. If a high frequency impedance measurement is taken at the same time as the cell voltage versus current density, then the cell voltage can be corrected for the IR loss by adding the product of the current density and cell resistance to the measured cell voltage, as indicated in FIG. 2 as the IR-corrected cell potential. The remaining gap between the 70 mV/decade kinetic loss line and the IR-corrected curve represents the cell voltage loss due to mass transport loss (MTL), shown as 45 mV.

Therefore it is believed that the amount of overpotential losses due to resistance, MTL, and kinetic losses are independent. The kinetic activity depends directly on the catalyst's ability to efficiently oxidize hydrogen on the anode and reduce oxygen on the cathode. The oxygen reduction reaction (ORR) is far less facile (by about $10^{-6}$) than hydrogen oxidation reactivity, and therefore the cathode catalyst ORR overpotential dominates the 70 mV/decade loss. The cathode catalyst ORR activity, defined as current generated at a specific voltage in the absence of IR and MTL losses, is a product of two factors: the catalyst's area-specific activity (SA)×the catalyst's electrochemical surface area (ECSA). The area-specific activity is measured in units of amperes/($cm^2$ of ECSA), and the ECSA is the surface area of the catalyst actually active for ORR in the PEM fuel cell. Thus, the present invention aims to increase the cathode catalyst's specific activity and/or its ECSA in order to optimize the PEM fuel cell performance.

One mode of MEA failure is breakdown of the polymer which comprises the PEM due to the action of peroxide radicals. One method for measuring the rate or degree of proton exchange membrane degradation is the rate of fluoride ion release, nanograms/min of fluoride ion.

Peroxide radicals may be generated from $H_2O_2$ produced on the cathode from incomplete oxygen reduction during the ORR process. The overall $2H_2 + O_2 \Rightarrow 2H_2O$ reaction is a four electron process but there are competitive $2e^-$ paths leading to $H_2O_2$ from incomplete oxygen reduction. The higher the specific activity of the catalyst for ORR, the greater the current generated through the $4e^-$ pathways compared to the $2e^-$ pathways, meaning more $H_2O$ relative to $H_2O_2$ is produced. Thus the greater the specific activity, the lower the amount of peroxide radicals produced.

It is an aim of the present invention to increase the durability of the membrane by reducing the peroxide radicals generated at their source without loss of catalyst performance, and in fact while optimizing performance. The present invention aims to achieve these objectives through selection of the catalyst composition and structure. The present invention:

a) uses nanostructured thin film catalysts instead of dispersed fine particle catalysts to give 5 times higher specific activity, thus reducing the ratio of $H_2O_2/H_2O$ produced by the cathode catalyst;

b) eliminates carbon particles as the catalyst support, by use of the NSTF catalysts, and thus eliminates a source of peroxide radical generation by the cathode catalyst;

c) uses PtCoMn and PtNiMn ternary NSTF catalysts, having volumetric ratios of Pt to transition metal of greater than about 2, to maximize the specific activity for ORR, fundamentally reducing the ratio of $H_2O_2/H_2O$ produced;

d) uses NSTF PtCoMn or PtNiMn ternary catalysts having volumetric ratios of Pt to transition metal of less than about 4 and Mn content equal to or greater than about 5 micrograms/$cm^2$ areal density to minimize the amount of fluoride ions released during fuel cell operation.

The use of an optimized NSTF catalyst on the cathode thus contributes to an increase in both performance and durability.

The layered fuel cell cathode catalyst according to the present invention may be made by any suitable method. Typically, the layered catalyst according to the present invention is made by alternate steps of vacuum deposition of a layer comprising or consisting essentially of platinum and a second layer, or a second and a third layer, on a film of microstructures. Typically the vacuum deposition steps are carried out in the absence of oxygen or substantially in the absence of oxygen. Typically, sputter deposition is used.

Any suitable microstructures may be used, including organic or inorganic microstructures. Typical microstructures are described in U.S. Pats. Nos. 4,812,352, 5,039,561, 5,176,786, 5,336,558, 5,338,430, 5,879,827, 6,040,077 and 6,319,293, and U.S. Pat. App. Pub. No. 2002/0004453 A1, now U.S. Pat. No. 6,482,763, the disclosures of which are incorporated herein by reference. Typical microstructures are made by thermal sublimation and vacuum annealing of the organic pigment C.I. Pigment Red 149, i.e., N,N'-di(3,5-xylyl) perylene-3,4:9,10-bis(dicarboximide). Methods for malcing organic nanostructured layers are disclosed in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. Nos. 4,568,598, 4,340,276, the disclosures of the patents are incorporated herein by reference. Properties of catalyst layers using carbon nanotube arrays are disclosed in the article "High Dispersion and Electrocatalytic Properties of Platinum on Well-Aligned Carbon Nanotube Arrays," Carbon 42 (2004) 191-197. Properties of catalyst layers using grassy or bristled silicon are disclosed in U.S. Pat. App. Pub. 2004/0048466 A1, now U.S. Pat. No. 6,946,362.

Alternately, the ternary catalyst may be deposited from a single target, as disclosed in co-pending patent application Ser. No. 11/248,441, filed simultaneously herewith.

Vacuum deposition may be carried out in any suitable apparatus, such as described in U.S. Pat. Nos. 5,338,430, 5,879,827, 5,879,828, 6,040,077 and 6,319,293 and U.S. Pat. App. Pub. No. 2002/0004453 A1, tbe disclosures of which are incorporated herein by reference. One such apparatus is depicted schematically in FIG. 4A of U.S. Pat. Nos. 5,879, 827 and 6,040,077, and discussed in the accompanying text, wherein the substrate is mounted on a drum which is then rotated under multiple DC magnetron sputtering sources in sequence. The resulting structure may be layered, or substantially layered, or may include more complex intermixed structures, depending on the thickness of the material deposited and the surface area of the substrate on which the material is deposited.

The catalysts of the present invention can be used to manufacture membrane electrode assemblies (MEA's) incorporated in fuel cells such as are described in U.S. Pat. Nos. 5,879,827 and 5,879,828, the teachings of which are incorporated herein by reference.

In making an MEA, GDL's may be applied to either side of a CCM. The GDL's may be applied by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present invention is typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

In the following examples, nanostructured thin film, thin layer catalyst (NSTF) based MEA's, were made and assembled as described in detail in U.S. patent application Ser. No. 10/674,594. The catalyst coated membrane (CCM) was made by lamination transfer of a pure Pt NSTF anode catalyst (0.15 mg/cm$^2$), and a PtCoMn or PtNiMn ternary NSTF catalyst cathode (with 0.1 mg-Pt/cm$^2$), to a 1.36 micron thick cast PEM with equivalent weight of about 1000. The cathode ternary catalysts had Pt/CoMn and Pt/NiMn volume ratios that were varied in the range from about 0.6 to 3, but also included infinity (pure Pt). The Co:Mn or Ni:Mn volumetric ratio (film thickness) was also varied between two values of 50:50 and 90:10, by use of two different sputtering targets. The multi-element NSTF ternary catalyst were made by alternating layers of Pt and CoMn (or NiMn) with variable thickness of the Pt and transition metal bi-layers, as described in the above patent application reference. The diffusion-current collectors (DCC) placed on either side of the CCM to form the MEA were fabricated by coating a gas diffusion micro-layer on one side of a Textron carbon cloth electrode backing layer that had been treated with Teflon to improve hydrophobicity. The same basic DCC and PEM were used for all the ternary samples. For the pure Pt sample, the DCC/GDL was a similarly treated carbon paper.

The MEA's were installed in 50 cm$^2$ cells, having quad-serpentine flow fields, at about 30% compression, and operated under a scripted protocol until the performance stabilized. Testing continued under multiple sets of operating conditions, including potentiodynamic scanning (PDS) at ambient pressure with constant flow conditions, and galvano-dynamic scanning (GDS) at 30 psig (3 atmospheres absolute=about 303 kPa), with constant stoichiometric flow rates. In particular, the PDS polarization curves were used to measure the specific activity for each catalyst composition according to the method described in Debe et al., "Activities of Low Pt Loading, Carbon-less, Ultra-Thin Nanostructured Film-Based Electrodes for PEM Fuel Cells and Roll-Good Fabricated MEA Performances in Single Cells and Stacks," 2003 Fuel Cell Seminar Abstract Book, pp. 812-815 ("2003 FC Abstract," incorporated herein by reference) at p. 812 bottom et seq., including FIG. 4 therein (referred to therein as "second method"). In that reference, it was shown that the fundamental area specific activity of the NSTF catalysts was about 5 times higher than Pt/C dispersed catalysts.

Table 1 below summarizes composition data for all of the Examples described following. In all cases of the ternaries the loading of Pt was 0.1 mg/cm$^2$, while for the pure Pt cathodes it was 0.15 mg/cm$^2$.

TABLE 1

| Ni:Mn Ratio | Co:Mn Ratio | Pt/TM bilayer Thickness | Mn in as-made Catalyst (μg/cm$^2$) |
|---|---|---|---|
| 50:50 | | 0.6 | 28 |
| 90:10 | | 3 | 1.1 |
| 50:50 | | 3 | 5.6 |
| 50:50 | | 1.2 | 14 |
| 90:10 | | 1.2 | 2.85 |
| Pure Pt | Pure Pt | n.a. | 0 |
| | 50:50 | 1.2 | 14 |
| | 90:10 | 0.6 | 5.69 |
| | 90:10 | 1.2 | 2.85 |
| | 90:10 | 3 | 1.1 |
| | 50:50 | 1.2 | 14 |
| | 90:10 | 0.6 | 5.6 |
| 90:10 (made with 2% Mn in PEM) | | 3 | 1.1 |

Example 1

Improving Catalyst Performance of Ternary NSTF Catalysts

Figure 3:
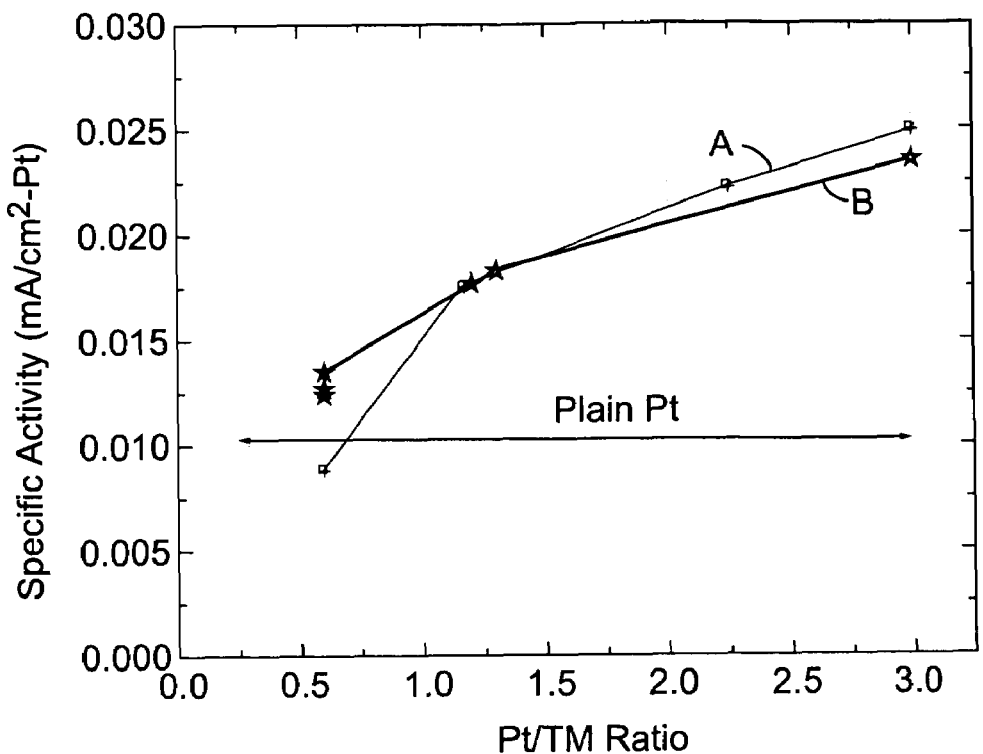
FIG. 3 is a plot of specific activity of PtNiMn (Trace A) and PtCoMn (Trace B) NSTF ternary catalysts according to the present invention versus Pt/transition metal bi-layer thickness ratio (volume ratio) obtained as described in Example 1.

Specific activities were determined by the method described in the 2003 FC Abstract reference by measuring two quantities for each NSTF ternary catalyst. The first quantity was the current density at a cell voltage of 0.813 volts, taken from the PDS polarization curve on the "up-scan" portion from lower to higher voltages. The second quantity was the ECSA, as described in the 2003 FC Abstract reference. The ratio of the current density at 0.813 V to the ECSA is the area-specific activity. This area-specific activity was plotted in FIG. 3 as a function of the platinum/transition metal volume ratio ("Pt/TM ratio")—that is, the ratio of the Pt layer thickness to the combined transition metal layer thickness—for PtNiMn (Trace A) and PtCoMn (Trace B) NSTF ternary catalyst samples. It is seen that, for Pt/TM ratios of up to at least 3, the specific activity for both types of ternaries increased monotonically with increasing Pt/TM ratio. Especially favorable specific activities were achieved at Pt/TM ratios of greater than about 2. The specific activity for pure Pt (Pt/TM=infinity) is indicated by a horizontal line in FIG. 3. The specific activity for pure Pt is the same as the specific activity obtained at a Pt/TM ratio of about 0.6. Thus, specific activity must, at some Pt/TM value above 3, begin to decrease and return to the value measured for pure Pt.

Example 2

Reducing Peroxide Production from PtNiMn NSTF Catalysts

In these examples, the rate of fluoride ion release during fuel cell operation is measured as an indication of the amount of peroxide radicals produced during operation. The operating protocol to measure the fluoride ion release was to collect anode and cathode water samples each half hour, noting net water, time and date. The cell was operated at 15/15 psig, 100%/100% RH and in a constant flow, constant voltage mode. With the temperature set at 90° C., hydrogen crossover was first measured, to make sure the cell was good. Thereafter the cell was operated at a constant voltage in the range of 0.4 to 0.8 V. After setting the cell voltage, a 20 minute initial equilibration time was followed by 2 hours of operation during which water was collected each half hour (4 samples total) from both the anode and cathode exit streams. Fluoride ion was measured using a Dionex ICS-2000 Ion Chromatography System. (Dionex Corporation, Sunnyvale, Calif.).

At cell voltages above 0.4V, the amount of hydrogen peroxide produced appeared to be inversely related to cell voltage. Production of significant amounts of fluoride was seen to start at voltages below 0.7V, consistent with the nominal 0.68V for the equilibrium peroxide-to-water reaction potential at 25° C. with unit activity of the reactant specie, and to rise with decreasing cell voltage. Fluoride content in both the anode and cathode water effluent of the MEA's was seen to be higher at 0.4V, the lowest voltage tested, than at any greater voltage.

Figure 4:
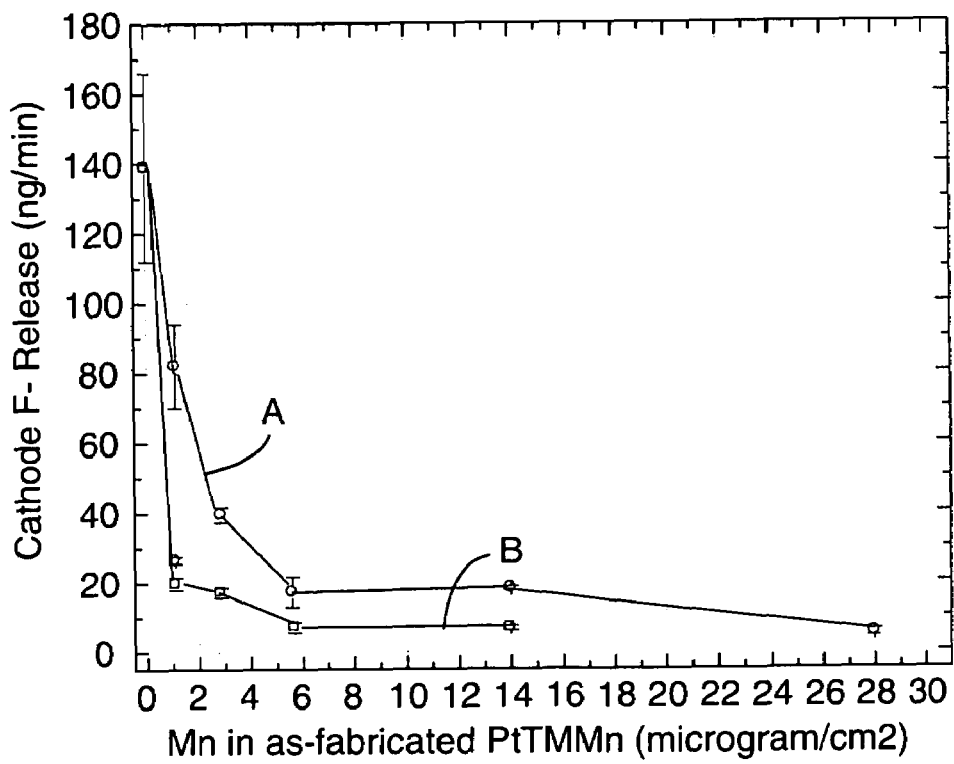
FIG. 4 is a graph of average rate of fluoride ion release from the cathode effluent of an MEA in operation as a function of the Mn content in the cathode catalyst of the MEA, as described in Examples 3 and 4.

In FIG. 4, the average fluoride ion release rate measured at 0.4V in the cathode water is plotted as a function of Mn content (areal density, in micrograms/cm$^2$) of the catalyst as fabricated for PtNiMn (Trace A) and PtCoMn (Trace B) NSTF ternary catalyst samples. In FIG. 4, it can be seen that the fluoride ion release rate was significantly reduced from that of pure Pt when the Mn content was raised to about 5 micrograms/cm$^2$, which (from Table I) corresponds to a Pt/TM ratio of about 3 for a PtNiMn catalyst having a Ni:Mn ratio of 50:50. Greater Mn content showed diminishing returns for further improvement in fluoride ion release rate.

Example 3

Reducing Peroxide Production from PtCoMn NSTF Catalysts

Fluoride ion release rate measurements were repeated for a series of MEA's containing PtCoMn cathodes, as summarized in Table I, using the same protocol as described above. The fluoride ion release was observed to vary with cell voltage in a similar manner to that shown for PtNiMn catalysts above.

The average fluoride ion from these samples at 0.4 V and 90° C. at 15/15 psig is shown in FIG. 4, which shows that the PtCoMn ternaries are more effective than PtNiMn in reducing the fluoride ion release rate for the same Mn content. In general, fluoride ion rates were uniformly lower for the Co-containing (Trace B) than Ni-containing (Trace A) ternaries at all levels of Mn. In FIG. 4, it can be seen that the fluoride ion release rate was significantly reduced from that of pure Pt when the Mn content was raised to about 5 micrograms/cm$^2$, a level similar to that found for PtNiMn catalysts. From Table I, it can be seen that this corresponds to a Pt/TM ratio of less than 3 for a PtCoMn catalyst having a Co:Mn ratio of 50:50. Again, greater Mn content showed diminishing returns for further improvement in fluoride ion release rate.

Example 4

Combining PtTM Ternary Catalysts with Mn-containing PEM.

In this example, an MEA was fabricated with a ternary catalyst cathode using a proton exchange membrane of the same composition as in prior examples except that MnNO$_3$ was added to the ionomer before casting the membrane such that the ratio of Mn cations to sulfonic acid groups in the ionomer was 0.02, as described in U.S. patent application Ser. No. 10/945,178, the disclosure of which is incorporated herein by reference. The fluoride ion release rate was measured from this MEA in an identical manner to that described in Examples 2 and 3 above. This Mn content was 1.1 microgram/cm$^2$. The measured fluoride ion release rate was about 25 ng/min, as compared to the 80 ng/min rate measured without added MnNO$_3$ in the ionomer, as reported in FIG. 4. This shows that combining the Pt/TM/Mn NSTF catalysts with a PEM containing a Mn additive can give a further reduction in fluoride ion release.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A fuel cell cathode catalyst comprising nanostructured elements comprising microstructured support whiskers bearing nanoscopic catalyst particles; wherein the catalyst comprises platinum and manganese and at least one other metal selected from the group consisting of Group VIb metals, Group VIIb metals and Group VIIIb metals other than platinum and manganese; wherein the volume ratio of platinum to the sum of all other metals in the catalyst is between about 1 and about 4, and wherein the Mn content is equal to or greater than about 5 micrograms/cm$^2$ areal density.

2. A fuel cell cathode catalyst according to claim 1 wherein the volume ratio of platinum to the sum of all other metals in the catalyst is between about 2 and about 3.

3. A fuel cell cathode catalyst according to claim 1 wherein the volume ratio of platinum to the sum of all other metals in the catalyst is between 2.5 and 3.5.

4. A fuel cell cathode catalyst according to claim 3 wherein the volume ratio of manganese to the at least one other metal is between 40:60 and 60:40.

5. A fuel cell cathode catalyst according to claim 4 wherein the at least one other metal is Ni.

6. A fuel cell cathode catalyst according to claim 4 wherein the at least one other metal is Co.

7. A fuel cell cathode catalyst according to claim 3 wherein the at least one other metal is Ni.

8. A fuel cell cathode catalyst according to claim 3 wherein the at least one other metal is Co.

9. A fuel cell cathode catalyst according to claim 1 wherein the volume ratio of platinum to the sum of all other metals in the catalyst is about 3.

10. A fuel cell cathode catalyst according to claim 1 wherein the volume ratio of manganese to the at least one other metal is between 10:90 and 90:10.

11. A fuel cell cathode catalyst according to claim 1 wherein the volume ratio of manganese to the at least one other metal is between 40:60 and 60:40.

12. A fuel cell cathode catalyst according to claim 1 wherein the at least one other metal is Ni.

13. A fuel cell cathode catalyst according to claim 1 wherein the at least one other metal is Co.

14. A fuel cell cathode catalyst comprising nanostructured elements comprising microstructured support whiskers bearing nanoscopic catalyst particles; wherein the catalyst comprises platinum and manganese and at least one other metal selected from the group consisting of Group VIb metals, Group VIIb metals and Group VIIIb metals other than platinum and manganese; wherein the volume ratio of platinum to manganese to the at least one other metal is about 6:1:1.

15. A fuel cell cathode catalyst according to claim 14 wherein the at least one other metal is Ni.

16. A fuel cell cathode catalyst according to claim 14 wherein the at least one other metal is Co.

17. A fuel cell membrane electrode assembly comprising the fuel cell cathode catalyst according to claim 1.

18. A fuel cell membrane electrode assembly according to claim 17 comprising a polymer electrolyte membrane which comprises a polymer electrolyte that comprises bound anionic functional groups and manganese cations.

19. The fuel cell membrane electrode assembly according to claim 18 where the amount of manganese cations present is between 0.001 and 0.5 charge equivalents based on the molar amount of anionic functional groups present in the polymer.

20. The fuel cell membrane electrode assembly according to claim 17 comprising a polymer electrolyte membrane which comprises a polymer electrolyte comprising pendent groups according to the formula:

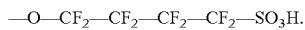

—O—CF$_2$—CF$_2$—CF$_2$—CF$_2$—SO$_3$H.

21. A method of making the cathode catalyst of claim 1 comprising alternating vacuum deposition of platinum and an alloy or intimate mixture of manganese and another metal selected from the group consisting of Group VIb metals, Group VIIb metals and Group VIIIb metals other than platinum and manganese.

22. A method of making the cathode catalyst of claim 1 comprising alternating vacuum deposition of platinum, manganese and another metal selected from the group consisting of Group VIb metals, Group VIIb metals and Group VIIIb metals other than platinum and manganese.

* * * * *

UNITED STATES PATENT AND TRADEMARK OFFICE
CERTIFICATE OF CORRECTION

PATENT NO.       : 7,622,217 B2
APPLICATION NO.  : 11/248561
DATED            : November 24, 2009
INVENTOR(S)      : Mark K. Debe It is certified that error appears in the above-identified patent and that said Letters Patent is hereby corrected as shown below:

On the Title Page
Item [57], ABSTRACT, delete "microgram/cm2"
     and insert -- microgram/cm$^2$ -- therefor.
  delete "MBA" and insert -- MEA -- therefor.

On the Title Page
Item [56], page 2, OTHER PUBLICATIONS
Line 3, delete "117 Membranes",
   and insert -- Nafion 117 Membranes -- therefor.

Drawings
In the drawings, Sheet 2 of 2, Fig. 4, delete "microgram/cm2"
     and insert -- microgram/cm$^2$ -- therefor.

Column 2
Line 4, delete "Group VIb metals, Group VIb metals"
  and insert -- Group VIb metals, Group VIIb metals -- therefor.
Line 5, delete "Group VIIb metals"
  and insert -- Group VIIIb metals -- therefor.
Line 38, delete "Group VIIb metals"
  and insert -- Group VIIIb metals -- therefor.

Column 4
Line 33, delete "typicaUy" and insert -- typically -- therefor.
Line 39 – 40, delete "FSO2-CF2CF2CF2CF2-O-CF=CF2
  and insert -- $FSO_2\text{-}CF_2CF_2CF_2CF_2\text{-}O\text{-}CF=CF_2$ -- therefor.

Column 5
Line 45, delete "micro structured" and insert -- microstructured -- therefor.
Line 57, delete "Group VIb metals"
    and insert -- Group VIIb metals -- therefor.
Line 63, delete "Group VIb metals"
    and insert -- Group VIIb metals -- therefor.

Column 8
Line 13, delete "malcing" and insert -- making -- therefor.
Line 38, delete "tbe" and insert -- the -- therefor.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,622,217 B2
APPLICATION NO. : 11/248561
DATED            : November 24, 2009
INVENTOR(S)      : Debe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Twenty-sixth Day of October, 2010

David J. Kappos
*Director of the United States Patent and Trademark Office*